(12) United States Patent
Märkl et al.

(10) Patent No.: US 9,533,562 B2
(45) Date of Patent: Jan. 3, 2017

(54) DRIVE DEVICE FOR A CHANGE-SPEED TRANSMISSION FOR MOTOR VEHICLES

(71) Applicant: Audi AG, Ingolstadt (DE)

(72) Inventors: Johann Märkl, Neuburg a.d. Donau (DE); Axel Heitmann, Ingolstadt/Etting (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/439,533

(22) PCT Filed: Oct. 23, 2013

(86) PCT No.: PCT/EP2013/003185
§ 371 (c)(1),
(2) Date: Apr. 29, 2015

(87) PCT Pub. No.: WO2014/067633
PCT Pub. Date: May 8, 2014

(65) Prior Publication Data
US 2015/0298536 A1    Oct. 22, 2015

(30) Foreign Application Priority Data
Oct. 30, 2012    (DE) .................. 10 2012 021 292

(51) Int. Cl.
*B60K 6/48* (2007.10)
*B60K 6/54* (2007.10)
(Continued)

(52) U.S. Cl.
CPC .............. *B60K 6/54* (2013.01); *B60K 6/365* (2013.01); *B60K 6/48* (2013.01); *B60K 6/52* (2013.01);
(Continued)

(58) Field of Classification Search
CPC .............. Y02T 10/6252; Y02T 10/6256; Y02T 10/6221; B60K 6/54; B60K 6/365; B60K 6/48; B60K 6/547; B60K 2006/541; F16H 57/10; F16H 3/725; F16H 37/046; Y10S 903/91
(Continued)

(56) References Cited

U.S. PATENT DOCUMENTS 8,043,187 B2    10/2011    Yang
8,627,736 B2    1/2014    Märkl
(Continued)

FOREIGN PATENT DOCUMENTS

AT    WO 2013000829 A1 *    1/2013    ............ B60K 6/387
CN    102166943 A    8/2011
(Continued)

OTHER PUBLICATIONS

International Search Report issued by the European Patent Office in International Application PCT/EP2013/003185 on Feb. 7, 2014.
(Continued)

*Primary Examiner* — Roger Pang
(74) *Attorney, Agent, or Firm* — Henry M. Feiereisen LLC

(57) ABSTRACT

A drive device for a change-speed transmission for motor vehicles, has at least one transmission input shaft, at least one axially parallel output shaft, having a plurality of gearwheel sets which are arranged on the shafts with fixed gearwheels and idler gears which can be switched via synchronizer clutches in order to form forward gears, and having at least one separating clutch. A planetary transmission which can be switched over into two transmission stages is connected upstream of the gearwheel sets of the forward gears, which planetary transmission has a driven input element, an output element which outputs to the input
(Continued)

shaft, and a transmission element which can be braked or coupled in order to switch over the transmission stages, wherein the transmission element can be coupled to an electric machine, by means of which the transmission element can be fixed or can be driven in both rotational directions.

13 Claims, 2 Drawing Sheets

(51) Int. Cl.
*B60K 6/547* (2007.10)
*F16H 3/00* (2006.01)
*F16H 37/04* (2006.01)
*B60K 6/365* (2007.10)
*B60K 6/52* (2007.10)
*F16H 57/10* (2006.01)
*F16H 3/72* (2006.01)
*B60K 17/346* (2006.01)

(52) U.S. Cl.
CPC .............. *B60K 6/547* (2013.01); *F16H 3/006* (2013.01); *F16H 3/724* (2013.01); *F16H 37/046* (2013.01); *F16H 57/10* (2013.01); B60K 17/346 (2013.01); B60K 2006/4816 (2013.01); B60K 2006/541 (2013.01); F16H 3/725 (2013.01); F16H 2200/0017 (2013.01); F16H 2200/0065 (2013.01); Y02T 10/6221 (2013.01); Y02T 10/6252 (2013.01); Y02T 10/6256 (2013.01); Y02T 10/6265 (2013.01); Y10S 903/91 (2013.01)

(58) Field of Classification Search
USPC .................. 475/5, 302, 339; 74/329, 330
See application file for complete search history.

(56) References Cited

U.S. PATENT DOCUMENTS

| 8,746,096 | B2 | 6/2014 | Märkl | |
|---|---|---|---|---|
| 2005/0205378 | A1 | 9/2005 | Miyazaki et al. | |
| 2011/0160947 | A1* | 6/2011 | Ideshio | B60K 6/387 701/22 |
| 2011/0177900 | A1* | 7/2011 | Simon | B60K 6/445 475/5 |
| 2012/0204675 | A1 | 8/2012 | Märkl | |
| 2012/0240699 | A1 | 9/2012 | Märkl | |
| 2013/0046427 | A1 | 2/2013 | Hohenberg | |
| 2013/0123057 | A1 | 5/2013 | Märkl | |
| 2013/0123058 | A1 | 5/2013 | Märkl | |
| 2013/0210567 | A1* | 8/2013 | Puiu | B60K 6/365 475/5 |
| 2013/0337972 | A1* | 12/2013 | Lee | B60W 20/40 477/5 |
| 2015/0167804 | A1* | 6/2015 | Lee | B60K 6/365 475/5 |

FOREIGN PATENT DOCUMENTS

| DE | 102 30 185 | 1/2004 | |
|---|---|---|---|
| DE | 603 02 573 | 7/2006 | |
| DE | 102006024053 | 11/2007 | |
| DE | 10 2007 022 774 | 11/2008 | |
| DE | 102008030376 | 6/2009 | |
| DE | 102010009832 | 9/2011 | |
| DE | 102010046766 | 3/2012 | |
| DE | 102011005029 | 9/2012 | |
| DE | 102011089163 | 6/2013 | |
| DE | 102011089708 | 6/2013 | |
| EP | 2 141 385 | 1/2010 | |
| IN | WO 2014174526 A1 * | 10/2014 | ............. B60K 6/365 |

OTHER PUBLICATIONS

Chinese Search Report issued on Aug. 2, 2016 with respect to counterpart Chinese patent application 201380056848.X.
Translation of Chinese Search Report issued on Aug. 2, 2016 with respect to counterpart Chinese patent application 201380056848.X.

* cited by examiner

DRIVE DEVICE FOR A CHANGE-SPEED TRANSMISSION FOR MOTOR VEHICLES

CROSS-REFERENCES TO RELATED APPLICATIONS

This application is the U.S. National Stage of International Application No. PCT/EP2013/003185, filed Oct. 23, 2013, which designated the United States and has been published as International Publication No. WO 2014/067633 and which claims the priority of German Patent Application, Serial No. 10 2012 021 292.5, filed Oct. 30, 2012, pursuant to 35 U.S.C. 119(a)-(d).

BACKGROUND OF THE INVENTION

The present invention relates to a drive arrangement for a change-speed transmission for motor vehicles.

In change-speed transmissions or manual transmissions it is generally known to increase the number of forward gears by arranging a layshaft assembly upstream of the gearwheel sets of the forward gears. The layshaft assembly can for example be a correspondingly shiftable planetary transmission.

SUMMARY OF THE INVENTION

It is an object of the invention set forth a drive device of the generic type by means of which increased degrees of freedom can be achieved with regard to the transmission configuration, while providing a great transmission spacing and a cost-effective construction.

The object is solved with the features of the independent claim. Advantageous refinements of the invention are set forth in the dependent claims.

According to the invention it is proposed that a planetary transmission is arranged upstream of the gearwheel sets of the forward gears, which planetary transmission can be shifted between two transmission stages and has a driven input element, an output element outputting onto the input element, and a transmission element which can be braked or coupled for shifting between the transmission stages, wherein the brake element is formed by an electric machine coupled to the transmission element, by means of which electric machine the transmission element can be fixed or driven in both directions of rotation. Beside the shifting to the lower transmission ratio by fixing (braking) the transmission element, the combination of the planetary transmission with the electric machine enables, through superposition of drive torque of the electric machine onto the transmission element of the planetary transmission for the forward gears, also driving a variable transmission ratio which is controlled to a defined degree. Further the reversible electric machine replaces a separate gearwheel set for a reverse gear so that overall the change-speed transmission can be configured very compact.

In particular with regard to greater internal combustion engage torques it is advantageous when the electric machine generates a braking effect together with the braking element. The braking element can preferably be package optimized configured as a band brake. As an alternative a conventional brake can also be used.

The drive arrangement (according to the independent claim) also enables using the E-machine as start-up element. Depending on the control of the E-machine (accelerating or decelerating) forward driving or backward driving start-up is possible in the internal combustion engine operation.

In a particularly preferred configuration it is proposed that the planetary transmission has a first sun gear as input element, which is constantly drivingly connected with the housing of the separating clutch, that the planetary transmission further has a second sun gear as output element, which outputs onto the input shaft, that a web with multistage planet gears as transmission element is in engagement with the two sun gears and is coupled with the separating clutch and that the web is coupled with the rotor of the electric machine. This results in a simply constructed planetary transmission in which the transmission ratios may be correspondingly variably controlled solely via the separating clutch and the braking element or drive element of the electric machine.

Hereby the rotor of the electric machine can constructively advantageously be arranged directly on a shaft, which connects the separating clutch with the web of the planetary transmission and preferably be interposed between the separating clutch and the planetary transmission.

Further the diameter of the ring-shaped electric machine with rotor and stator can approximately correspond to the greatest outer diameter (enveloping circle) of the planetary transmission and be arranged for generating a compact arrangement in the same surrounding transmission housing.

In and advantageous refinement of the invention, the change-speed transmission can be a dual clutch transmission with two coaxial input shafts, which can be activated via two separating clutches and output onto a subtransmssion A with forward gears and a subtransmission B with forward gears onto at least one output shaft, wherein the planetary transmission and the electric machine are coupled with the input hollow shaft of the subtransmission A. As a consequence the number of forward gears of the gearwheel sets of the subtransmission A is doubled and can be controlled variably; at the same time the reverse gear can be formed via a forward gear in the subtransmission A and the electric machine, while the gearwheel sets of the subtransmission B form simple forward gears which can be shifted via synchronizer clutches.

For this, in an advantageous configuration the subtransmission A can have three gearwheel sets with idler gears and fixed gears, via which the forward gears 1/2, 4/5, 7/8 can be shifted, while the simple forward gears 3, 6, 9 are assigned to the subtransmission B. The gearwheel sets for the $1^{st}/2^{nd}$ gear or the lowest transmission ratio can advantageously be also used as reverse gear.

In a preferred configuration, which is easy to realize in terms of construction and has a favorable efficiency, the upstream arranged planetary transmission can be shifted to a lower transmission ratio by fixing the web for forming the forward gears 1, 4, 7, and can be shifted into a higher 1:1 transmission ratio by engaging the separating clutch K1 for forming the forward gears 2, 5, 8.

In addition the transmission ratio of the planetary transmission or that of the shifted forward gears, can be variably controlled via the electric machine by rotational speed superimposition at the transmission element or the web of the planetary transmissions to thereby configure variable gear steps (transmission spacing) shorter or longer, which gear steps are predetermined by the gearwheel sets and which may depend on the required power on the internal combustion engine and/or different driving programs of the motor vehicle.

In addition when the separating clutch is disengaged and a small forward gear is shifted, the motor vehicle can be driven forward or backward via the electric machine; when the separating clutch is engaged and the forward gears are not shifted the internal combustion engine of the motor vehicle can be started, and in particular in the 1:1 transmission ratio of the planetary transmission, can be controlled as generator for generating electricity.

BRIEF DESCRIPTION OF THE DRAWING

In the following, an exemplary embodiment of the invention is explained in more detail by way of the included schematic drawing. It is shown in.

DETAILED DESCRIPTION OF PREFERRED EMBODIMENTS

Figure 1:
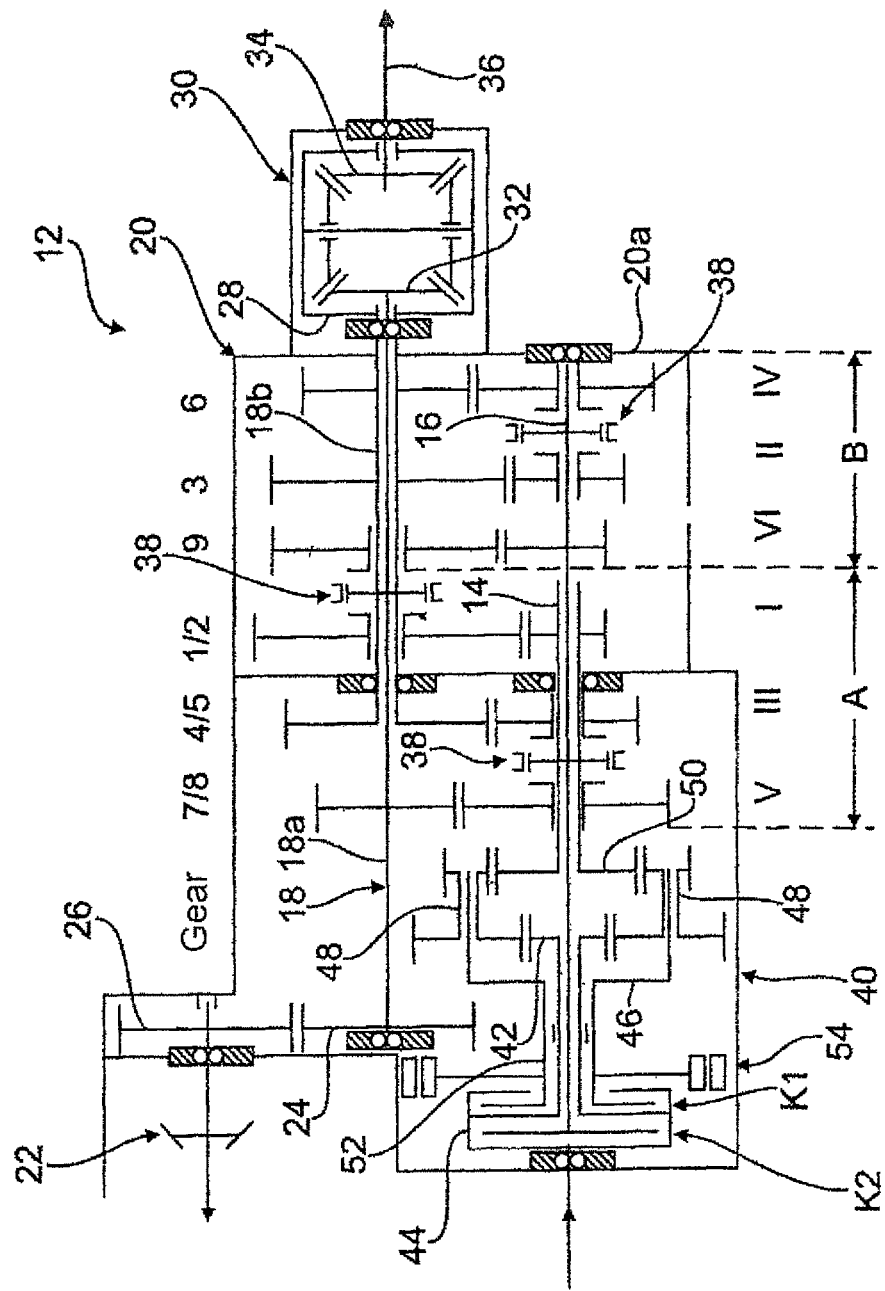
FIG. 1 a block diagram of a dual clutch transmission for motor vehicles with an upstream arranged planetary transmission and an electric machine integrated in the planetary transmission.

FIG. 1 shows very schematically a ducal clutch transmission 12 as change-speed transmission for motor vehicles with two coaxial transmission input shafts 14, 16 which can be drivingly connected with a driving drive aggregate or an internal combustion engine (not shown) via two separating clutches K1, K2. The input shaft 14 is configured as a hollow shaft.

Provided axially parallel to the input shafts 14, 16 is an output shaft 18, which in the exemplary embodiment is formed by a first output shaft 18a and a second output shaft 18b, which is configured as hollow shaft.

The first output shaft 18a outputs onto a front axle differential 22 (only shown schematically) via spur gears 24, 26, while the second output shaft 18b outputs onto the differential housing 28 of an interaxle differential 30, whose output elements or bevel gears 32, 34 are connected on one side with the output shaft 18a for driving the front axle differential 22, and on the other side with an output shaft 36 for driving the rear axle differential (not shown) of the motor vehicle.

The shown configuration of the output shaft 18 with the interaxle differential 30 makes it possible that individual forward gears directly output onto the front axle differential, while other forward gears form an all-wheel drive via the interaxle differential 30.

When only outputting onto an axle differential 22 (front drive) or via the output shaft 36 onto a rear axle differential (rear drive), the output shaft 18 can also be configured one-piece and without interaxle differential.

The mentioned shafts 14, 16, 18 etc. are rotatably supported in the transmission housing 20 via only schematically shown rolling bearings.

The dual clutch transmission 12 is divided into a subtransmission A and a subtransmission B, wherein the input hollow shaft 14 only extends within the subtransmission A, while the input shaft 16 is guided through the input shaft 14 into the subtransmission B up to its end wall 20a.

In the subtransmission A three forward-gear gearwheel sets I, III, V are arranged, which as is known, are formed by fixed gears and idler gears, wherein the idler gears can be shifted via synchronizer clutches (generally designated 38). The gearwheel sets I, II, V form the forward gears 1/2, 4/5, 7/8 (as explained below).

In the subtransmission B also three forward-gear gearwheel sets II, V and VI are provided, which are also formed by fixed gears and idler gears, which can be shifted via a synchronizer clutch 38, and which in the corresponding transmission ratio configuration form the forward gears 3, 6 and 9.

A planetary transmission 40 is arranged upstream of the subtransmission A adjacent the dual clutch K1, K2, and is configured coaxial to the input hollow shaft 14 and in terms of transmission layout can be shifted between two transmission stages or respectively to a lower transmission stage and a higher 1:1 transmission stage.

Figure 2:
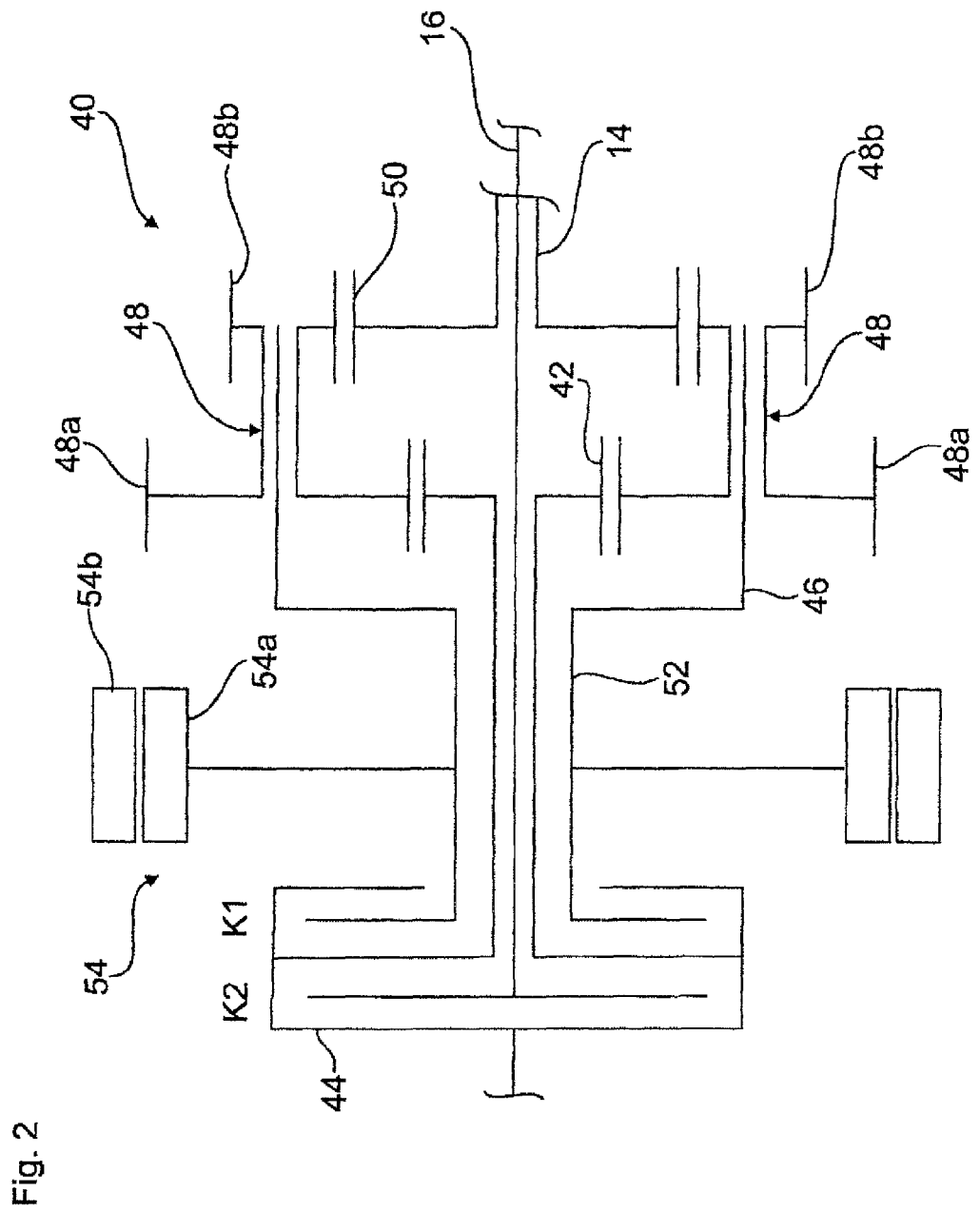
FIG. 2 in a schematic representation the planetary transmission with electric machine as individual unit.

Hereby the input element of the planetary transmission 40 (see also FIG. 2) is formed by a first sun gear 42, which is connected to the housing 44 of the dual clutch K1, K2 and thus is constantly driven.

The web 46 as transmission element of the planetary transmission 40 carries multiple rotatably supported multistage planet gears 48 of which the one greater gearwheel 48a meshes with the sun gear 42 and can be drivingly connected with the clutch K1.

The smaller gearwheel 48b of the multistage planet gears 48 is connected with the input hollow shaft 14 of the subtransmission A with a second sun gear 50 as output element of the planetary transmission 40.

Further, the hollow shaft 52, which carries the web 46, is connected to the ring-shaped electric machine 54. The rotor 54a is directly fastened on the hollow shaft 52, while the stator 54b is inserted into the surrounding transmission housing 20 (FIG. 1). The diameter of the stator windings is slightly greater than the greatest enveloping circle of the planetary transmission 40 formed by the multistage planet gears 48.

The electric machine 54 can be a three-phase AC machine that connected to the electric drive system of the motor vehicle with a corresponding traction battery and which can be switched to operated as electric motor as well as a generator.

When the clutch K1 is disengaged and the electric machine 54 is switched so that its brake moment blocks the web, the sun gear 42 drives the sun gear 50 via the multistage planet gears 48, and the sun gear 50 drives the input shaft 14 in the lower transmission stage; at correspondingly shifted gearwheel sets of the subtransmission A this corresponds to the forward gears 1 (here the starting of the motor vehicle is controlled by the electric machine 54 via the exerted braking torque), 4 and 7. When the electric machine 54 is switched currentless the drive power is interrupted.

For shifting the planetary transmission 40 into the higher 1:1 transmission stage the clutch K1 is engaged, wherein the sun gear 42 and the web 46 are now switched together and the planetary transmission 40 is blocked in itself. The drive moment is correspondingly divided via the clutch K1 and the housing 44. In the 1:1 transmission stage of the planetary transmission 40 the forward gears 2, 5, 8 can be shifted.

For shifting the forward gears 3, 6, and 9 of the subtransmission B the gearwheel sets II, IV or VI are shifted in a conventional manner via the synchronizer clutches 38 and activated via the separating clutch K2. Hereby the clutch K1 is disengaged and the electric machine 54 is not supplied with current.

Beside the described switching function the electric machine 54 can also be controlled as electric motor in the forward rotational direction and thus superimpose a drive torque or a rotational speed on the web 46, which imposes a variable transmission ratio on the forward gears (for example $1^{st}$ gear) that have just been shifted via the synchronizer clutches 38, whereby the gear steps, which are fixedly predetermined in the subtransmission A via the gearwheel sets I, II, V, can be more or less changed.

The electric machine 54 can further be switched in the opposite direction of rotation as electric motor and thus preferably form a reverse gear when the $1^{st}$ forward gear (gearwheel set I) is shifted. For this the clutch K1 has to be disengaged.

In order to generate electricity for the traction battery if needed, the electric machine 54 can also be switched to function as a generator during driving (recuperative operation) of the motor vehicle, in particular when the clutch K1 is closed.

Finally the electric machine 54 can (contribute to) drive the internal combustion engine in the boost mode as well as for starting the internal combustion engine when the clutch K1 is closed.

The invention is not limited to the shown exemplary embodiment.

The change-speed transmission can also be configured as simple, optionally automated, manual transmission without subtransmission B, without a second separating clutch K2 and without a second input shaft 16. The input shaft 14 may then carry as a single shaft the required forward-gear gearwheel sets (also more or fewer than described).

What is claimed is:

1. A drive device for a change-speed transmission for motor vehicles, comprising:
   at least one transmission input shaft, at least one axially parallel output shaft, with multiple gearwheel sets arranged on the input shaft and the output shaft, each gearwheel set having fixed gears and idler gears shiftable with synchronizer clutches for forming forward gears, and with at least one separating clutch;
   a planetary transmission shiftable between two transmission stages and arranged upstream of the gearwheel sets that form the forward gears, said planetary transmission having a driven input element, an output element outputting onto the input shaft, and a transmission element, said transmission element being fixable thereby causing the planetary transmission to assume one of the two transmission stages, or couplable in rotative fixed relationship with the input element via the separating clutch thereby causing the planetary transmission to assume the other one of the two transmission stages; and
   an electric machine operatively connectable to the transmission element, and constructed for fixing the transmission element and to drive the transmission element in opposite directions of rotation, wherein the input element is constructed as a first sun gear, which is constantly drivingly connected with a housing of the at least one separating clutch, wherein the output element is constructed as a second sun gear outputting onto the input shaft wherein the transmission element is constructed as a web having multistage planetary gears and is in engagement with the first and second sun gears and is coupled with the separating clutch, said web being coupled with a rotor of the electric machine.

2. The drive device of claim 1, wherein the rotor of the electric machine is directly arranged on a shaft which connects the separating clutch with the web of the planetary transmission.

3. The drive device of claim 1, wherein the electric machine is constructively interposed between the separating clutch and the planetary transmission.

4. The drive device of claim 1, wherein the electric machine is constructed ring-shaped and a diameter of the ring-shaped electric machine including a rotor and a stator approximately corresponds to a greatest outer diameter of the planetary transmission, said electric machine and said planetary transmission being arranged in a common surrounding transmission housing.

5. The drive device of claim 1, wherein the change-speed transmission is constructed as a dual clutch transmission divided into a first subtransmission and a second subtransmission each comprising forward gears, said drive device further comprising a further input shaft arranged coaxial to the input shaft, said input shaft and said further input shaft being respectively activatable via one of two separating clutches, and act on the first subtransmission and the second subtransmission on said at least one output shaft, and wherein the planetary transmission and the electric machine output onto the input shaft of the first subtransmission, said input shaft being constructed as a hollow shaft.

6. The drive device of claim 5, wherein the forward gears comprise gears 1, 2, 3, 4, 5, 6, 7, 8 and 9, and wherein the first subtransmission has three said gearwheel sets, via which the forward gears 1/2, 415, and 7/8 are shiftable, with the forward gears 3, 6, 9 being assigned to the second subtransmission.

7. The drive device of claim 1, wherein the forward gears comprise gears 1, 3, 4, 6, 7 and 9, and wherein the planetary transmission is shiftable into a lower one of the transmission ratios by fixing the web for forming the forward gears 1, 4, 7, and is shiftable into a higher one of the transmission ratios having a ratio of 1:1 by engaging the separating clutch for forming the forward gears 3, 9, 6.

8. The drive device of preceding claim 1, wherein the transmission ratio of the planetary transmission or the transmission ratio of shifted ones of the forward gears is variably controllable by superimposition of rotational speeds on the transmission element of the planetary transmission.

9. The drive device of claim 1, wherein when the separating clutch is disengaged and a small one forward gears is shifted, the motor vehicle is drivable forward or backward via the electric machine.

10. The drive device of claim 1, wherein when the separating clutch is engaged and the forward gears are not shifted, the internal combustion engine of the motor vehicle is rendered startable.

11. The drive device of claim 1, wherein in the a 1:1 transmission stage of the planetary transmission the electric machine is controllable as generator for generating electricity.

12. The drive device of claim 1, further comprising a brake element, which together with the electric machine generates a braking effect.

13. The drive device of claim 12, wherein the brake element generates a braking effect at increased internal combustion engine torques.

* * * * *